United States Patent
Hisanaga et al.

(10) Patent No.: US 7,249,459 B2
(45) Date of Patent: Jul. 31, 2007

(54) FLUID MACHINE FOR CONVERTING HEAT ENERGY INTO MECHANICAL ROTATIONAL FORCE

(75) Inventors: Shigeru Hisanaga, Kariya (JP); Yasushi Yamanaka, Nakashima-gun (JP); Kenji Tsukahara, Anjo (JP); Kazuhide Uchida, Hamamatsu (JP)

(73) Assignees: DENSO Corporation, Kariya (JP); Nippon Soken, Inc., Nishio (JP)

( * ) Notice: Subject to any disclaimer, the term of this patent is extended or adjusted under 35 U.S.C. 154(b) by 93 days.

(21) Appl. No.: 10/868,867

(22) Filed: Jun. 17, 2004

(65) Prior Publication Data

US 2004/0255591 A1 Dec. 23, 2004

(30) Foreign Application Priority Data

Jun. 20, 2003 (JP) .............................. 2003-176816

(51) Int. Cl.
*F01K 27/00* (2006.01)

(52) U.S. Cl. ........................... 60/641.1; 60/645; 60/670

(58) Field of Classification Search ............... 60/641.1, 60/645, 670
See application file for complete search history.

(56) References Cited

U.S. PATENT DOCUMENTS 6,464,467 B2 * 10/2002 Sullivan et al. ............... 417/53
6,928,820 B2 * 8/2005 Inaba et al. .................... 60/618
6,962,056 B2 * 11/2005 Brasz et al. ................... 60/772
2005/0235670 A1 * 10/2005 Takeuchi et al. ........... 62/238.6

FOREIGN PATENT DOCUMENTS

| JP | A-H06-159855 | 6/1994 |
|---|---|---|
| JP | A-H08-86289 | 4/1996 |

* cited by examiner

*Primary Examiner*—Hoang Nguyen
(74) *Attorney, Agent, or Firm*—Posz Law Group, PLC

(57) ABSTRACT

A fluid machine according to the present invention has an expansion device for collecting waste heat from an internal combustion engine and converting the collected heat energy into mechanical rotational force, an electric rotating device selectively operating as an electric power generator and as an electric motor, and a pump device for pressurizing refrigerant for Rankine cycle, wherein those components are operatively connected with each other by a single rotating shaft. When starting up Rankine cycle, the electric rotating device is operated as the electric motor, so that the pump device is driven to pressurize and pump out high pressure refrigerant. Once the expansion device starts its operation, the electric rotating device is rotated by the expansion device and therefore the operational mode of the electric rotating device is switched over to the power generating mode. The expansion device will be operated at its maximum efficiency in relation to the heat energy inputted into the Rankine cycle, by controlling the power generation at the electric rotating device.

12 Claims, 12 Drawing Sheets

(ROTATIONAL ANGLE : 0°)

(ROTATIONAL ANGLE : 90°)

(ROTATIONAL ANGLE : 270°)

(ROTATIONAL ANGLE : 180°)

(ROTATIONAL ANGLE : 0°)

(ROTATIONAL ANGLE : 90°)

(ROTATIONAL ANGLE : 270°)

(ROTATIONAL ANGLE : 180°)

(ROTATIONAL ANGLE : 0°)

(ROTATIONAL ANGLE : 90°)

(ROTATIONAL ANGLE : 270°)

(ROTATIONAL ANGLE : 180°)

FLUID MACHINE FOR CONVERTING HEAT ENERGY INTO MECHANICAL ROTATIONAL FORCE

CROSS REFERENCE TO RELATED APPLICATION

This application is based on Japanese Patent Application No. 2003-176816 filed on Jun. 20, 2003, the disclosures of which is incorporated herein by reference.

FIELD OF THE INVENTION

The present invention relates to a fluid machine for collecting heat energy from working fluid, for example refrigerant, by Rankine cycle, and converting the heat energy into mechanical rotational force, in particular to an expansion device for utilizing waste heat from an internal combustion engine.

BACKGROUND OF THE INVENTION

In a prior art fluid machine, for example shown in Japanese (Non-examined) Patent Publication H6-159855, an expansion device and a compressor device are housed in a single hermetically sealed housing and heat energy is collected by Rankine cycle to convert the collected energy into a rotational driving force by the expansion device, wherein the compressor is driven by the rotational driving force to operate a refrigerating cycle.

The conventional fluid machine for the expansion and compressor devices needs a lot of components for the Rankine cycle and those components are independently provided. Accordingly, in such a fluid machine, the total system for the Rankine cycle and the refrigerating cycle is inevitably complicated and needs a more space. As a result, the conventional system and the fluid machine is not preferable for a use for a motor vehicle.

SUMMARY OF THE INVENTION

It is, therefore, an object of the present invention, in view of the above mentioned problems, to provide a fluid machine which is simple in its construction and smaller in its size, and an expansion device of which can be operated at its maximum efficiency.

A fluid machine according to the present invention has an expansion device for collecting waste heat from an internal combustion engine and converting the collected heat energy into mechanical rotational force, an electric rotating device selectively operating as an electric power generator and as an electric motor, and a pump device for pressurizing refrigerant for Rankine cycle, wherein those components are operatively connected with each other by a single rotating shaft. When starting up Rankine cycle, the electric rotating device is operated as the electric motor, so that the pump device is driven to pressurize and pump out high pressure refrigerant. Once the expansion device starts its operation, the electric rotating device is rotated by the expansion device and therefore the operational mode of the electric rotating device is switched over to the power generating mode. The expansion device will be operated at its maximum efficiency in relation to the heat energy inputted into the Rankine cycle, by controlling the power generation at the electric rotating device.

According to another feature of the invention, the expansion device, electric rotating device and the pump device are housed in a single hermetically sealed housing, to eliminate complicated sealing structure and elements, which would be otherwise necessary for sealing the shaft from the respective housings.

According to a further feature of the invention, the electric rotating device is disposed (i.e. filled with) in the refrigerant, so that electric discharge between the brushes and a commutator is suppressed to elongate a lifetime of the brushes.

According to a further feature of the invention, the expansion device, the electric rotating device and the pump device are vertically arranged, and an inlet for the cooled down refrigerant is formed at an upper side of the electric rotating device. Furthermore, a tank is provided at a lowermost portion of the fluid machine for keeping the liquid-phase refrigerant. According to these features, the electric rotating device and the pump device can be cooled down by the refrigerant to improve their efficiency, and the pump device can be more effectively operated, since generation of gas bubbles can be suppressed.

According to a further feature of the invention, the scroll type expansion device is operatively connected to the shaft over a crank mechanism, so that the expansion device would not be an obstacle for the operation of the pump device by the electric rotating device, even in case that the expansion device is not rotated by itself.

When the expansion device is operatively connected to the shaft over a one way clutch, the same effect can be obtained.

According to a further feature of the invention, the electric rotating device is a direct current electric machine and the rotational directions thereof are made to be the same for both of the operations as the electric motor and the power generator. As a result, a stable operation of the brushes can be obtained, namely a jumping of the brushes from the commutator during the operation can be suppressed.

According to a further feature of the invention, the motor device is connected a control unit and a battery, so that the operational mode of the electric rotating device is controlled by the control unit and the electricity generated at the electric rotating device is charged into the battery. Furthermore, the electricity to be generated at the electric rotating device is controlled in response to the heat energy inputted to the Rankine cycle so that the expansion device can be operated at its maximum efficiency.

According to a further feature of the invention, a flow control valve is provided at an upstream side of the heating device of the Rankine cycle, so that the heat energy to be inputted to the Rankine cycle can be controlled in an optimum manner depending on temperature of the working fluid (hot water of the engine cooling water).

According to a further feature of the invention, the expansion device comprises a variable capacitor expansion device, so that the expansion device can be operated at its maximum efficiency depending on the heat energy inputted to the Rankine cycle and the electric power can be generated at the electric rotating device to meet the demands of the electrical loads.

According to a further feature of the invention, the fluid machine is integrally assembled to the heating device and/or a condenser, to make a total system further simpler and smaller in its structure.

According to a further feature of the invention, a compressor device for a refrigerating cycle is integrally fixed to the fluid machine, so that the compressor device is driven by the expansion device. When the above fluid machine is used for a motor vehicle, the electric power is generated and the compressor for an automotive air-conditioning system is operated by utilizing the waste heat from an engine, to thereby improve a fuel consumption ratio.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
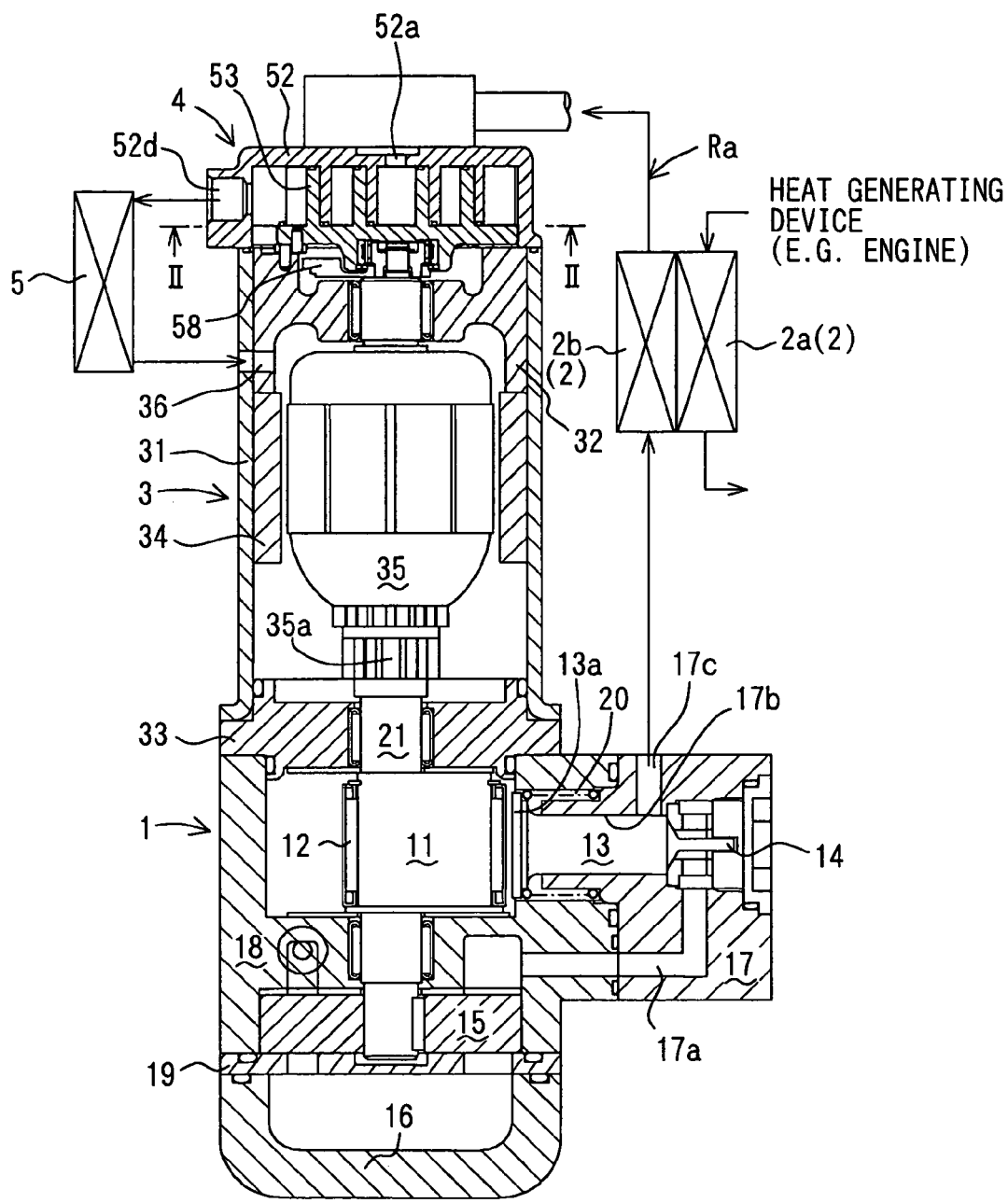
FIG. 1 is a cross-sectional view of a fluid machine according to a first embodiment of the present invention.
Figure 2:
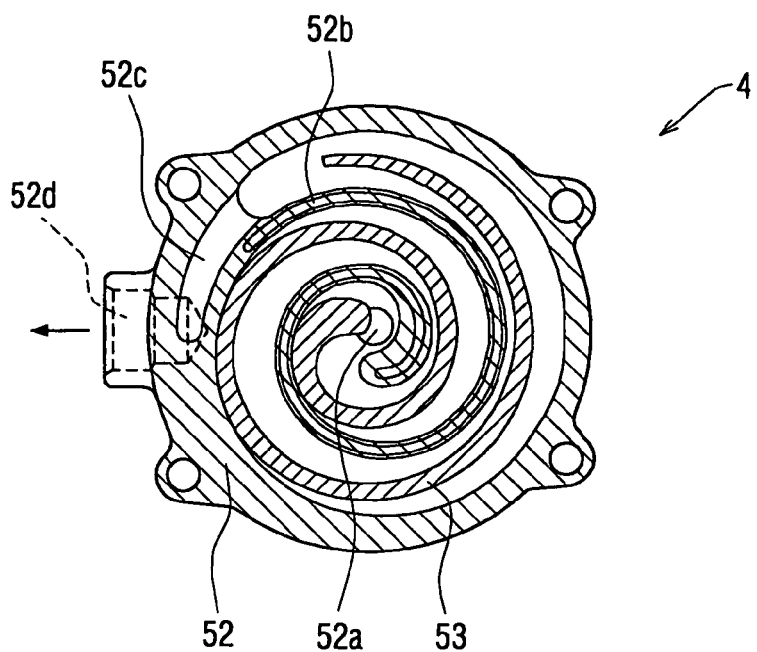
FIG. 2 is a cross-sectional view taken along a line II-II in FIG. 1 showing an expansion device.

A first embodiment of the present invention will now be explained with reference to FIGS. 1 through 5. A fluid machine of the present invention is used to, for example, a motor vehicle, which is composed of an expansion device 4, a pump device 1 and an electric rotating device 3 (also referred to as a motor device). The expansion device 4 converts the heat energy of the Rankine cycle Ra into a rotational driving force, the pump device 1 is driven by the expansion device 4 to pressurize working fluid in the Rankine cycle Ra, and the motor device 3 generates a rotational driving force. A single shaft 21 is commonly used for the expansion device 4, the pump device 1 and the motor device 3. It is, needless to say, possible to integrally connect respective shafts with one another for the expansion device 4, the pump device 1 and the motor device 3.

The Rankine cycle Ra is composed of the pump device 1 for pressurizing and circulating the working fluid (refrigerant), a heating device 2 having a hot water passage 2a through which hot water of engine cooling water flows and a refrigerant passage 2b through which the refrigerant flows, wherein the heating device 2 heats and vaporizes the liquid-phase refrigerant by the heat of the hot water from an engine (a heat generating device), the expansion device 4 for expanding high pressure refrigerant to generate a rotational force, and a condenser 5 for cooling down and condensing the refrigerant. Those components for the Rankine cycle Ra are connected with one another by pipes to form a closed loop for the refrigerant.

And the expansion device 4, the pump device 1 and the motor device 3 are housed in a hermetically sealed single (or integrated as one unit) housing, through which the refrigerant flows. The housing, according to the embodiment, is composed of a tank portion 16 for receiving liquid-phase refrigerant, a cylinder block 17, a pump casing 18, a valve plate 19, a yoke 31, a support plate 33, an expansion device housing 52 and seal elements such as O-rings, wherein the above components are connected to each other by through-bolts (not shown) to form the single hermetically sealed housing.

In the fluid machine of this embodiment, the pump device 1 is arranged at a lower side of the motor device 3 (and the expansion device 4) in a vertical direction, an inlet port 36 through which the liquid-phase refrigerant condensed at the condenser 5 flows into the housing is formed at an upper side of the motor device 3. The tank portion 16 is formed at the lowermost end of the fluid machine so that the liquid-phase refrigerant is kept in this tank portion at a start of the operation of the fluid machine.

The expansion device 4 will be explained more in detail with reference to FIGS. 1 to 5. The expansion device 4 is of a so-called scroll type expansion device and comprises a fixed scroll 52b and a movable scroll 53, wherein a pair of scroll wraps of the fixed and movable scrolls is engaged with each other to form multiple working chambers between the adjacent scroll wraps. The high pressure refrigerant flows into the expansion device 4 through a suction port 52a formed at a central portion of the expansion device housing 52 and will be expanded within the working chambers. The movable scroll 53 will be rotated (in an orbital motion) by such expansion energy and the refrigerant flows out of the expansion device 4 through a discharge port 52d through a discharge passage 52c.

Figure 3A:
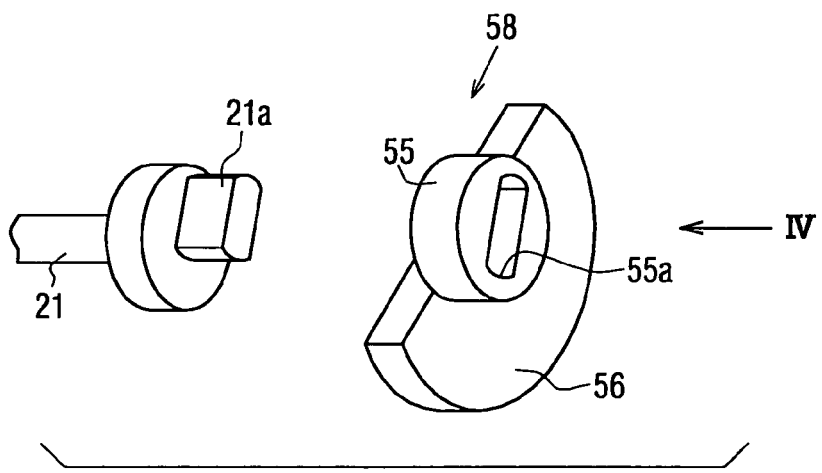
FIG. 3A is a perspective view showing a crank mechanism.
Figure 3B:
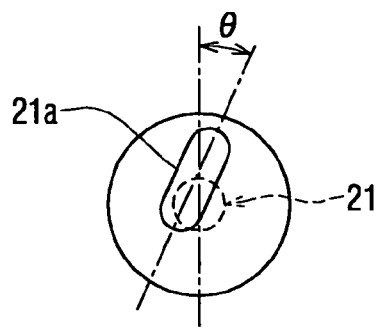
FIG. 3B is a front view of a shaft shown in FIG. 3A.
Figure 4:
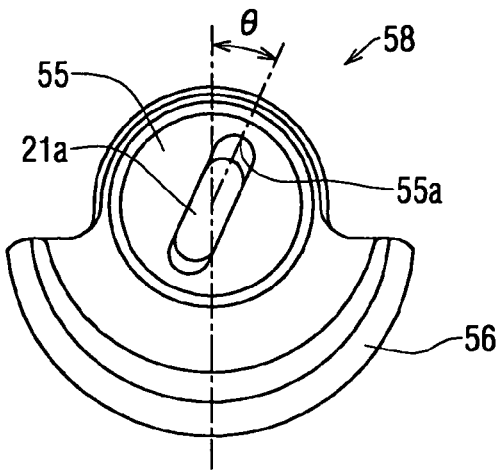
FIG. 4 is a front view of the crank mechanism when viewed in a direction of an arrow IV in FIG. 3A.

The expansion device 4 is operatively connected to one end of the shaft 21 through a crank mechanism 58 to transmit the rotational force from the expansion device 4 to the shaft 21. The crank mechanism 58 varies a radius of the orbital movement of the movable scroll 53 by means of the driving force from the expansion device 4. FIG. 3A shows a perspective view of the crank mechanism 58 and FIG. 4 shows a front view of the crank mechanism viewed in a direction of an arrow IV in FIG. 3A. As shown in the drawings, a key portion 21a is formed at an end of the shaft 21 and inserted into a groove 55a formed in a bush 55. The key portion 21a is so formed at the end of the shaft 21 that a longitudinal center line of the key portion 21*a* is inclined towards a rotational direction of the shaft 21 by an angle θ with respect to a line passing on the center of the shaft 21, as shown in FIG. 3B and FIG. 4.

A longitudinal length of the groove 55*a* is longer than a longitudinal length of the key portion 21*a*, so that the key portion 21*a* is movable in its longitudinal direction relative to the groove 55*a*. A movable distance of the key portion 21*a* in the groove is smaller than a distance between the spiral wraps of the fixed and movable scrolls 52 and 53 in a line passing on the center of the bush 55.

The width of the groove 55*a* is made slightly larger than the width of the key portion 21*a*, so that the key portion 21*a* is movable in the groove 55*a* in its longitudinal direction. A balance weight 56 is formed at the bush 55 to cancel a centrifugal force of the movable scroll 53 appearing during its orbital motion.

Figure 5A:
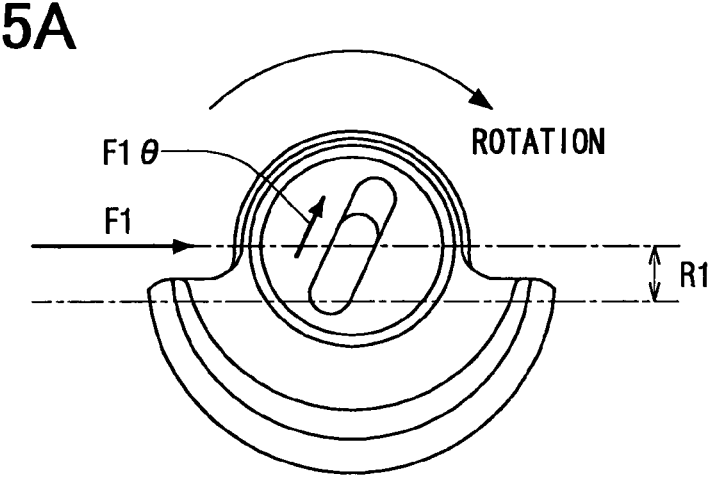
FIGS. 5A and 5B are illustrations for explaining an operation of the crank mechanism.
Figure 5B:
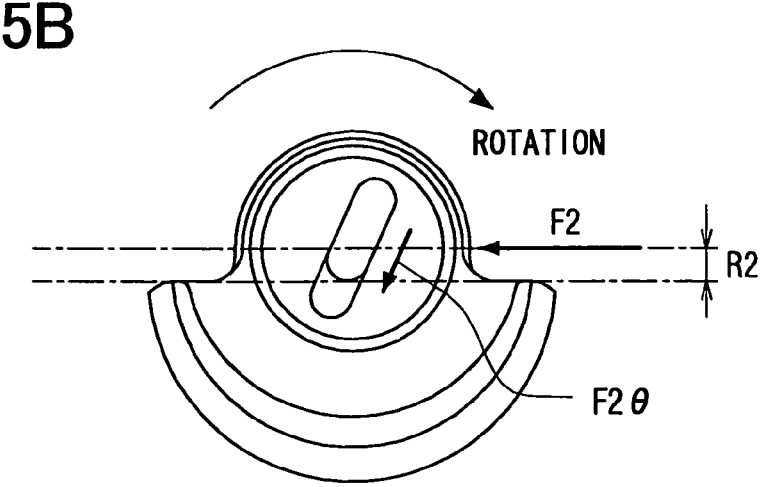

FIGS. 5A and 5B show the operation of the crank mechanism 58, in which the radius of the orbital motion of the movable scroll 53 is varied. In FIG. 5A, when the expansion device 4 is operating and thereby a driving force F1 is applied to the bush 55, a component force F1θ is generated to push the bush 55 upwardly in the longitudinal direction of the groove 55*a*. As a result, a distance between the center of the shaft 21 and the center of the bush 55, namely a radius (R1) of the orbital motion of the movable scroll 53 is increased.

On the other hand, as shown in FIG. 5B, when the expansion device 4 is running idle and thereby a resistance force F2 for the idle running is applied to the bush 55, a component force F2θ is generated to push the bush 55 downwardly in the longitudinal direction of the groove 55*a*. As a result, the distance between the centers of the shaft and the bush is, i.e. the radius (R2) of the orbital motion will be reduced. The operation of the crank mechanism is described more in detail in a prior art, for example, in Japanese Patent No. 2687873.

(Start-up Mode)

When starting the Rankine cycle Ra, electric power will be supplied to the motor device 3 from an outside electric power source (not shown). The motor device 3 comprises a stator 34 arranged at an inner surface of the yoke 31 and a rotor 35 rotationally supported by a pair of support plates 32 and 33. When the motor device 3 starts to rotate, the pump device 1 which has the shaft 21 commonly used for the motor device 3 will start its operation.

When the shaft 21 is rotated, a feed pump 15 connected to the motor device 3 via the common shaft 21 will be likewise rotated and the liquid-phase refrigerant contained in the tank 16 is sucked into the feed pump 15 and fed to a suction passage 17*a*. Since the trochoid-type feed pump is used here, the liquid-phase refrigerant will be surely sucked and fed to a piston 13, even when some gas bubbles are contained in the liquid-phase refrigerant.

A crank pin 11 is formed to the shaft 21 so that the crank pin 11 will be moved in a crank motion when the shaft 21 is rotated. A bearing 12 is provided at an outer surface of the crank pin 11 and moved in the crank motion with the crank pin 11. A seat portion 13*a* of the piston 13 seats on an outer race of the bearing 12, so that the crank motion of the crank pin 11 is converted into a reciprocal movement of the piston 13. A spring 20 is provided between the seat portion 13*a* and the cylinder block 17 to urge the piston 13 towards the bearing 12.

With the reciprocal movement of the piston 13, the liquid-phase refrigerant will be sucked into and pumped out from a pumping chamber of the pump device 1. The piston 13 is reciprocally disposed in a cylindrical bore 17*b* formed in the cylinder block 17 to form therein the pumping chamber. When the piston 13 is moved in a leftward direction, the pumping chamber will be enlarged to suck the liquid-phase refrigerant into the chamber by opening a check valve 14 provided in the suction passage 17*a*. When the piston 13 is moved in a rightward direction, the liquid-phase refrigerant will be pressurized to close the check valve 14 and then pumped out to the heating device 2 through a pump-out port 17*c*.

The pressurized liquid-phase refrigerant is evaporated at the heating device 2 by the heat energy from the engine cooling water and superheated gas-phase refrigerant will be introduced into the expansion device 4 through the suction port 52*a*. The gas-phase refrigerant introduced into the expansion device 4 will be then expanded to move the movable scroll 53. During a start up period, however, the expansion device 4 is not outputting a sufficient driving force to drive the shaft 21, and therefore, the movable scroll 53 is dragged by the rotation of the shaft 21 which is rotated by the motor device 3, rather than the expansion energy of the refrigerant.

As the crank mechanism 58 is provided between the shaft 21 and the movable scroll 53, the radius of the orbital motion of the movable scroll 53 is maintained at the reduced position, unless the expansion device 4 generates the driving force enough to drive the shaft 21. When the radius of the orbital motion is maintained at its reduced position, a gap is formed between the adjacent scroll wraps of the fixed and movable scrolls. In this situation, even when the movable scroll 53 is rotated by the motor device 3, the expansion device 4 is not performing any fluidic works, and therefore consumption of the driving force for the movable scroll 53 is very small.

When it is required to avoid the above idle running of the movable scroll 53, a power transmission control device, for example one way clutch, can be disposed between the shaft 21 and the movable scroll in place of the crank mechanism 58. Until the expansion device generates a sufficient driving force by the expansion of the refrigerant, the expansion device (the movable scroll) is running idle because of the crank mechanism 58 (or the one way clutch) and the rotation of the motor device 3 is not affected.

When the expansion energy at the expansion device 4 becomes larger enough to drive the shaft 21, the supply of the electric power to the motor device 3 is cut off and the operation of the pump device 1 will be continued by the driving force generated at the expansion device 4. At this moment, the movable scroll 53 grows out of the idle running and the shaft 21 is driven by the expansion device 4. The pump device 1 is thus operated by the expansion device 4 via the shaft 21 and the expansion device 4 will be continuously operated so long as the heat energy will be applied to the Rankine cycle Ra.

(Power Generation Mode)

As above, once the expansion device 4 starts to operate, the pump device 1 and the shaft 21 are driven by the expansion device 4. In this operation, the motor device 3 is also rotated by the shaft 21. The electric power supply to the motor device 3 is cut off and then the motor device 3 is operated as an electric power generator.

The electric power generated at the motor device 3 can be supplied to other electric devices (electrical loads) or charged into a battery. The motor device 3 is composed of a direct current motor, in which the shaft 21 is rotated in the same direction in both cases of generating the rotational force as the motor and of generating electric power as the generator.

The characteristic features of the above embodiment will be explained. The Rankine cycle comprises the pump device 1 for pressurizing the refrigerant, the heating device 2 for heating and vaporizing the liquid-phase refrigerant through the heat exchange between the liquid-phase refrigerant from the pump device 1 and the hot water from the heat generating device (e.g. the engine), the expansion device 4 for converting the heat energy of the super heated refrigerant into the rotational force, the condenser 5 for condensing the refrigerant from the expansion device 4. The fluid machine comprises the expansion device 4, the motor 3 (selectively operated as the motor or power generator), and the pump device 1, wherein those three components are operatively connected to each other by means of the single shaft 21.

As a result, the fluid machine according to the embodiment can be made simpler and smaller in structure and lower in cost, and thereby it can be used for a motor vehicle. In the conventional system, a pump device is generally driven by an electric motor, and therefore it is necessary to continuously supply electric power to the pump device so long as the Rankine cycle is operated. On the other hand, the pump device 1 is driven by the expansion device 4 according to the above embodiment, so that the expansion device 4 and the pump device 1 are continuously operated so long as the heat energy is supplied to the Rankine cycle. Accordingly, once the expansion device 4 starts its operation, it is no longer necessary to supply the electric power to the motor device for keeping the running of the pump device.

The expansion device 4, the pump device 1 and the motor device 3 are housed in the hermetically sealed single housing, resulting in that no complicated sealing devices is required for sealing the shaft and so on, to reduce the cost. The expansion device 4, the pump device 1 and the motor device 3 are disposed in the same refrigerant atmosphere, being separated from the ambient atmosphere, so that corrosion and electric leakage can be easily avoided. In particular, since brushes for the motor device 3 are disposed in the liquid-phase refrigerant, electric discharge between the brushes and a commutator is suppressed to elongate a lifetime of the brushes.

The pump device 1 is arranged at a vertically lower side of the motor device 3 and the expansion device 4, and the inlet port 36 through which the liquid-phase refrigerant from the condenser 5 flows into the fluid machine is formed at a vertically higher side of the motor device 3. Accordingly, the cooling down effect of the liquid-phase refrigerant improves efficiency of the motor device 3 and/or the expansion device 4.

The tank 16 is arranged at the lower end of the fluid machine in the vertical direction, so that the liquid-phase refrigerant is kept in the tank 16, from which the refrigerant is sucked into the pump device 1. As a result, the quantity of gas bubbles contained in the liquid-phase refrigerant is made smaller, to increase the efficiency of the pump device 1.

The expansion device 4 is composed of the scroll type expansion device and the movable scroll 53 is operatively connected to the shaft 21 via the crank mechanism 58, so that the radius of the orbital motion of the movable scroll can be varied by the driving force generated at the expansion device 4. Accordingly, even during the expansion device is not generating the driving force, it will not be an obstacle for the operation of the motor device 3 and the pump device 1.

The motor device 3 is selectively driven by the expansion device 4 to generate the electric power. This is advantageous in that no additional electric power generator is necessary and the fluid machine or the system can be made simpler and smaller. For example, when the fluid machine is used for the motor vehicle, an operation of an alternator (an alternating current generator) mounted on an engine can be stopped during a period in which the electric power is generated at the fluid machine (the motor device 3) by utilizing the waste heat from the engine, resulting in that fuel consumption ratio of the engine can be improved.

The motor device 3 is composed of the direct current motor, so that additional device such as an inverter is not necessary, to keep the structure simpler and smaller and the cost lower. For example, when the invention is used for the motor vehicle, the source of the direct current can be directly used to the fluid machine of the invention. In the motor device 3, it is arranged that the shaft is rotated in the same rotational direction in either case of generating the rotational force as the electric motor or the case of generating the electric power as the generator. As a result, a stable operation of the brushes can be obtained, namely a jumping of the brushes from the commutator during the operation can be suppressed.

Second Embodiment

A second embodiment will be explained with reference to FIG. 6, which schematically shows the Rankine cycle Ra and an electric circuit. An electric control unit 71 is provided for controlling the operation of the motor device 3 and connected to a battery 72 and to another electric device 73 (electrical loads).

When the motor device 3 is operated to drive the pump device 1, the electric power is supplied from the battery 72 to the motor device 3. In this operation, the electric control unit 71 controls the electric voltage to the motor device 3 so that the number of revolution of the pump device 1 and thereby fluid flow of the refrigerant will be controlled. In the case that the motor device 3 is operated as the generator, the control unit 71 controls the generated voltage to vary the electric load to the motor device 3. As a result, operational conditions, such as the rotational speed of the motor device 3, the pressure of the refrigerant in the Rankine cycle Ra and so on will be regulated.

(Start up Mode)

When starting up the operation of the Rankine cycle Ra, the electric power is supplied from the battery 72 (the outside power source) to the motor device 3. During an initial stage of this start up operation, it is likely happen that the pump device 1 may catch up gas bubbles in the refrigerant to reduce the pump efficiency of the pump device 1. To the end, the pump device 1 is so controlled by the electric control unit 71 that the number of revolution will be gradually increased (the applied electric voltage will be gradually increased).

The control unit 71 also controls a switching over of the operation from the rotation of the shaft 21 by the motor device 3 to the rotation by the expansion device 4. Namely, when the driving force to be generated at the expansion device 4 exceeds a driving force necessary for driving the motor device 3, the control unit 71 stops the supply of the electric power to the motor device 3 and instead applies the electric load. The switching over operation is done by use of a timer, or a detection of the refrigerant pressure on a high pressure side of the Rankine cycle Ra.

(Power Generating Mode)

After the operation is switched over to the power generating mode, the control unit 71 controls the electricity generated at the motor device 3. When the heat energy from the engine (the outside heat generating device) is small, the generated voltage will be decreased by the control unit 71 to thereby decrease the electric load to the motor device 3 and the electricity. When the heat energy is large, the generated voltage will be increased to thereby increase the electric load to the motor device 3 and the electricity. Whether the heat energy is small or large can be detected by monitoring temperature of the hot water flowing through the heating device 2, or by monitoring pressure of the refrigerant on a high pressure side in the Rankine cycle.

The above described control of the electricity makes it possible to operate the expansion device 4 at its maximum efficiency. If the suction volume as well as the discharge volume of the expansion device 4 is fixed, it may happen that the refrigerant in the working chamber will be discharged before it will be fully expanded (insufficient expansion), or that the working chamber does not reach a point where the working chamber will be communicated to the discharge port of the expansion device even when the refrigerant has been fully expanded, so that the refrigerant will be further expanded (over expansion). Those insufficient expansion and over expansion of the refrigerant decreases the efficiency of the expansion device 4.

According to the present embodiment, it is possible, by the control unit 71, to control the pressure of the refrigerant on the high pressure side (i.e. on the suction port side of the expansion device 4) at such a value, at which the expansion device will be operated at its maximum efficiency. The electric load to the motor device 3 will be increased by the control unit 71 and thereby the rotational speed of the expansion device 4 will be decreased, when it is necessary to increase the pressure of the Rankine cycle on the high pressure side, and vice versa. This kind of the control can be done by detecting the pressure of the refrigerant on the high pressure side as well as on the lower pressure side, and the detected pressures are fed back to the control unit 71. It is also possible to detect the temperature of the refrigerant at the inlet and outlet ports of the expansion device 4 to perform a more precise operation of the expansion device.

As described above in the above embodiment, the control unit 71 and the battery 72 are connected to the fluid machine to control the operation of the motor device 3 and to charge the electricity generated at the motor device 3 into the battery 72. Accordingly, the operation of the Rankine cycle Ra can be smoothly started up and the operational mode of the motor device 3 can be easily switched from the motor mode to the power generating mode after the Rankine cycle Ra has started up with its operation. Furthermore, it is possible to perform the power generating operation, while the maximum efficiency of the expansion device 4 is kept, depending on the heat energy to be inputted to the Rankine cycle.

Third Embodiment

Figure 7:
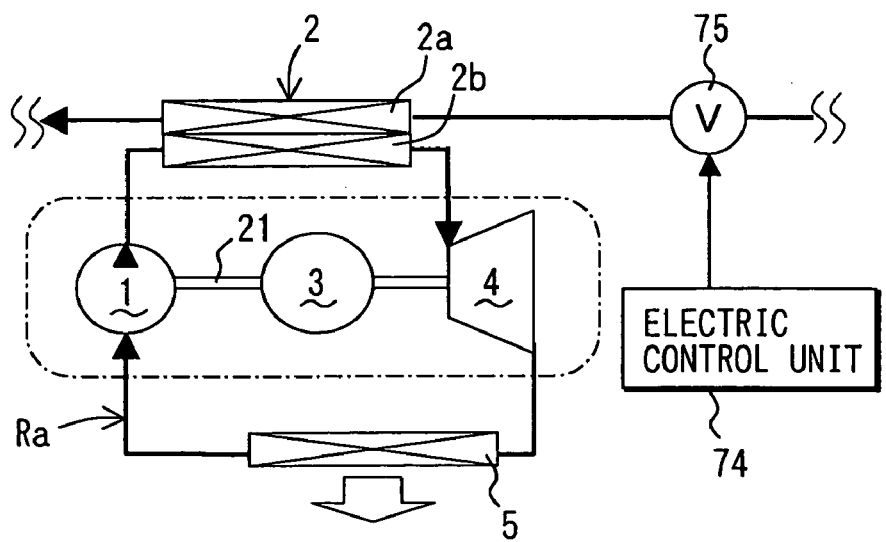
FIG. 7 is a schematic diagram showing a Rankine cycle Ra and a flow control device according to a third embodiment.

A third embodiment will be explained with reference to FIG. 7. A flow control device (valve) 75 is provided at an upstream side of the heating device 2, so that flow volume of the engine cooling water (hot water) is controlled by the flow control valve 75. The flow control valve 75 is operated by electric signals from a control unit 74. In this embodiment, the rotational speed of the expansion device 4 and the pump device 1 as well as the electricity generated at the motor device 3 are controlled by the flow volume of the engine cooling water to the heating device 2.

(Power Generating Mode)

The electricity generated at the motor device 3 is directly controlled by the input of the heat energy to the heating device 2 which is controlled by the control unit 74 and the flow control valve 75. When the electric power demand is high, the flow volume of the hot water is increased, whereas the flow volume is decreased at the lower electric power demand. When the temperature of the hot water becomes lower, the flow volume will be increased to keep a required amount of heat input, whereas the flow volume will be decreased at higher temperature of the hot water, so that constant electricity will be obtained.

The above described control of the electricity makes it also possible to operate the expansion device 4 at its maximum efficiency. In the case of the insufficient expansion at the expansion device 4, the flow volume of the hot water is increased to thereby increase the pressure in the Rankine cycle Ra on the high pressure side. In the case of the over expansion, on the contrary, the flow volume will be decreased to thereby decrease the pressure in the Rankine cycle on the high pressure side. For this operation, the pressure of the refrigerant in the Rankine cycle Ra and/or the temperature of the refrigerant at the suction and discharge sides of the expansion device 4 are detected.

As above, the flow volume of the hot water to the heating device 2 is controlled by the flow control valve 75 and the control unit 74, so that the electricity generated at the motor device 3 is controlled in proportion to the electric power demand, and the electricity can be controlled at the constant value even when the temperature of the hot water from the heat energy source (the engine) is changed. As a result, the expansion device 4 will be operated at its maximum efficiency.

Fourth Embodiment

Figure 8A:
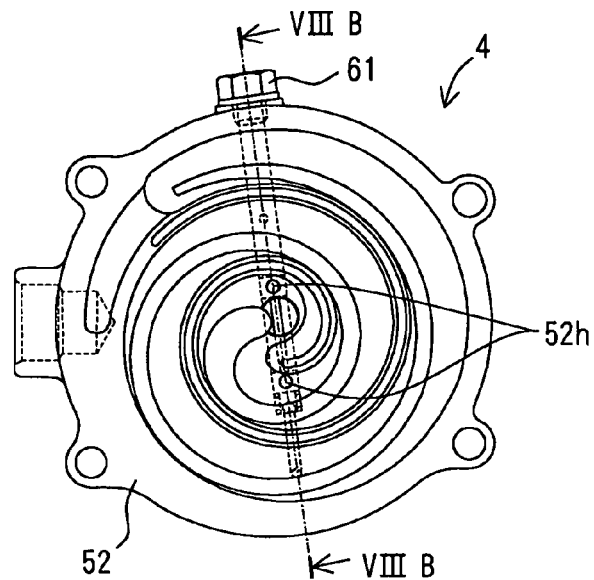
FIGS. 8A and 9A are front views of scrolls for a variable capacitor expansion device.
Figure 8B:
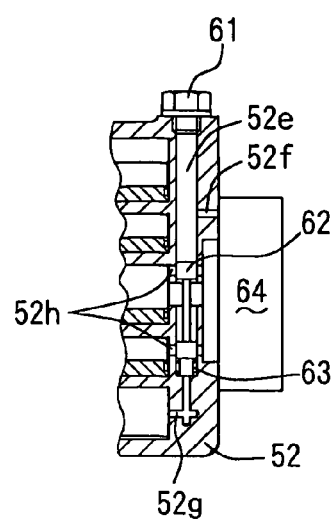
FIGS. 8B and 9B are cross-sectional views taken along lines VIIIB-VIIIB in FIG. 8A and IXB-IXB in FIG. 9A.
Figure 9A:
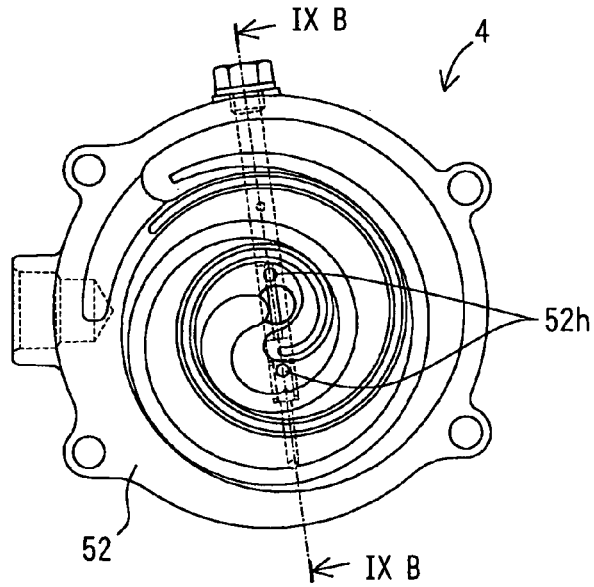

A fourth embodiment will be explained with reference to FIGS. 8 to 10. In this fourth embodiment, a variable capacitor type expansion device 4 is used to prevent the insufficient expansion and the over expansion, wherein FIGS. 8A and 8B show a condition in which the capacity is not varied, whereas FIGS. 9A and 9B show a condition in which the capacity is changed.

A spool bore 52e is formed in the housing 52 of the expansion device 4 and an open end of the spool bore 52e is closed by a plug 61. In the spool bore 52, a barbell type spool 62 is reciprocally disposed and a spring 63 is also disposed in the bore 52e to urge the spool 62 in an upward direction of the drawing.

The spool bore 52 is communicated with the working chamber at such a position of lower pressure through a low pressure communication port 52g, and a pair of bypass ports 52h is formed in the housing 52 close to the suction port 52a. When the high pressure gas-phase refrigerant is supplied to the spool bore 52e by a control valve 64, the spool 62 is moved in a downward direction of the drawing due to a pressure difference, against the spring force of the spring 63, as shown in FIG. 8B. With the position of the spool 62, the pair of bypass ports 52h is closed by large diameter portions of the spool 62, and the expansion device 4 operates in the normal manner.

Figure 9B:
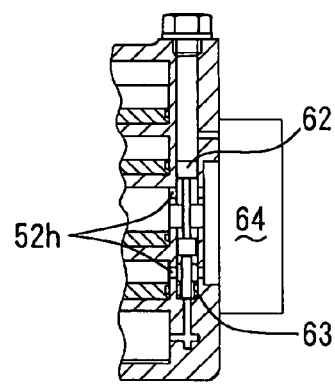

When the supply of the high pressure gas-phase refrigerant to the spool bore 52e is stopped by the control valve 64, the spool is moved in the upward direction of the drawing by the spring force of the spring 63, as shown in FIG. 9B. With this position of the spool 62, the pair of bypass ports 52h is opened and communicated to the working chamber, which is in the suction stroke. When the bypass ports 52h become in communication with the working chamber, the high pressure gas-phase refrigerant flows into the working chamber through the suction port 52a and the bypass ports 52h, and a closing timing of the bypass ports is delayed compared with that of the suction port 52a. Accordingly, suction volume of the working chamber becomes larger and expansion ratio becomes smaller. Additional bypass ports can be formed in the housing 52 and opening and closing of those additional bypass ports can be controlled by the spool, so that the suction volume and the expansion ratio can be further changed in more steps.

Figure 10A:
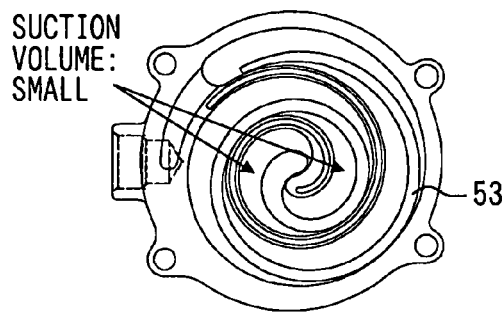
FIGS. 10A and 10B are front views of scrolls of the expansion device for explaining the operation of capacitor variation.
Figure 10B:
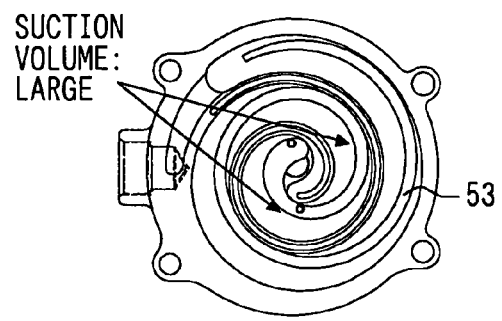

FIGS. 10A and 10B respectively show the position of the movable scroll 53 at such a position, where the suction stroke ends. Namely, in FIG. 10A, the expansion device 4 operates at its normal capacitor, and therefore the suction stroke ends when the suction port 52a is closed by the movable scroll 53. In FIG. 10B, the expansion device 4 operates with its capacitor changed, so that the suction stroke ends when the bypass ports 52h as well as the suction port 52a are closed by the movable scroll 53. As seen from these drawings, the suction volume in FIG. 10B is larger than that in FIG. 10A.

(Power Generating Mode)

When the insufficient expansion is likely occurring, the control valve 64 is controlled to close the bypass ports 52h by introducing the high pressure gas-phase refrigerant into the spool bore 52e, so that suction volume becomes smaller. Then the volume ratio (=discharge volume/suction volume) becomes higher to prevent the insufficient expansion. On the other hands, when the over expansion will be likely occurring, the control valve 64 is so controlled to open the bypass ports 52h and thereby to increase the suction volume. Then the volume ratio (=discharge volume/suction volume) becomes lower to prevent the over expansion.

As above, the insufficient expansion and the over expansion are prevented, and the volume ratio of the expansion device 4 is selected in an optimum manner depending on the pressure of the refrigerant in the Rankine cycle Ra. And as a result, the expansion device 4 can be operated at its maximum efficiency. This operation can be done to control the electricity generated at the motor device 3. When the electric power demand is small, the suction volume of the expansion device 4 is made larger, then the rotational speed of the expansion device 4 decreased, because the rotational speed is given by a relational expression of the volume flow with respect to the suction volume.

Since the rotational speed of the expansion device 4 is the rotational speed of the pump device 1, and the rotational speed of the pump device 1 corresponds to the volume flow of the refrigerant, it is possible to regulate the volume flow of the refrigerant in the Rankine cycle Ra at its optimum value depending on the electric power demands, by controlling the suction volume. When the electric power demand is high, the suction volume is controlled to be smaller, to increase the rotational speed of the expansion device and thereby the pump device 1.

It is also possible to control the operation of the expansion device depending on the heat energy from the engine cooling water, which is inputted to the heating device 2. When the heat energy to be inputted is small, the suction volume of the expansion device 4 is controlled to be larger, so that the rotational speed of the expansion device 4 becomes lower.

When the rotational speed of the expansion device 4 becomes lower, the rotational speed of the pump device 1 becomes likewise lower and finally the flow volume of the refrigerant will be decreased. As above, it is possible to control the flow volume of the Rankine cycle Ra in the optimum manner depending on the heat energy collected at the heating device 2, by regulating the suction volume of the expansion device 4.

When the heat energy to be inputted is high, the suction volume of the expansion device 4 is controlled to be smaller, so that the rotational speed of the expansion device 4 and the pump device 1 becomes higher. The control valve 64 is operated by detecting the pressure of the refrigerant in the Rankine cycle at high and low pressure side and/or the temperature of the engine cooling water.

According to the fourth embodiment above described, the variable capacitor expansion device is used to operate the expansion device 4 at its maximum efficiency. It is further possible to operate the expansion device (i.e. to generate electric power) in its optimum manner depending on the electric power demand, and to operate the Rankine cycle depending on the inputted heat energy.

Fifth Embodiment

Figure 11:
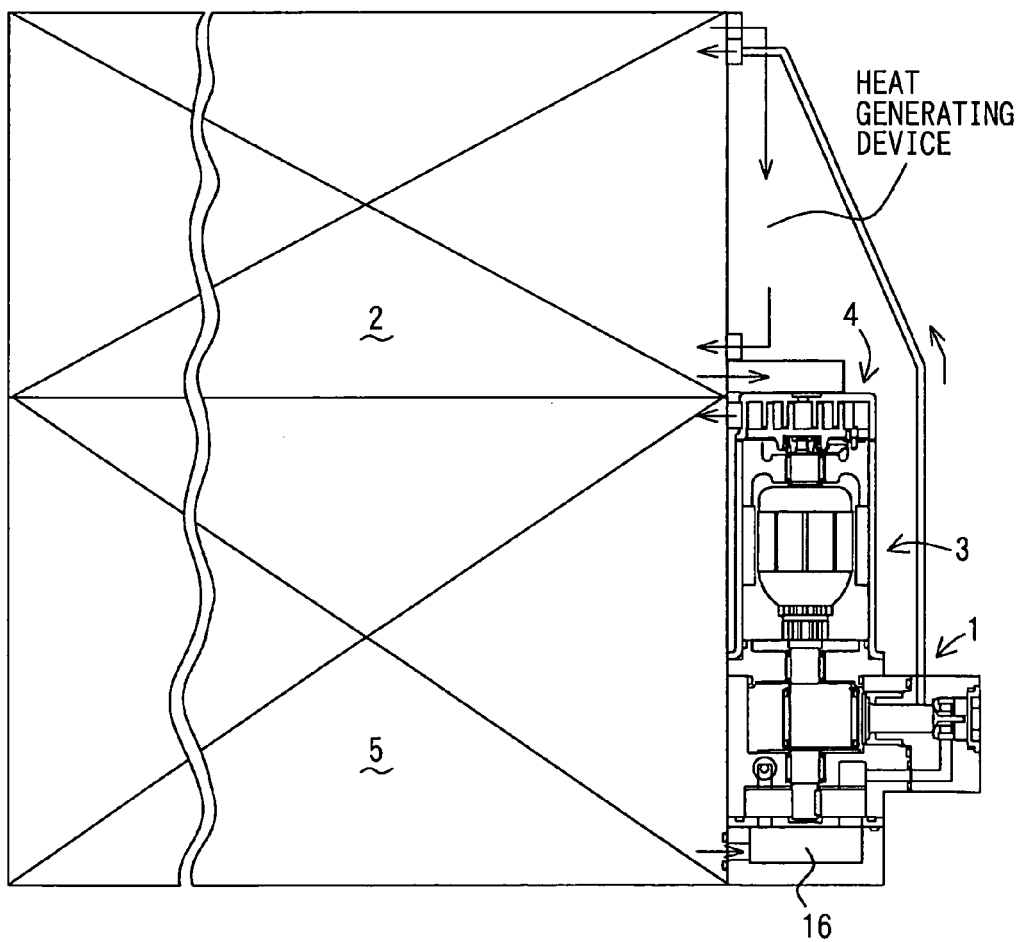
FIG. 11 is a schematic diagram showing the fluid machine according to a fifth embodiment.

A fifth embodiment is shown in FIG. 11, in which the fluid machine having the pump device 1, the motor device 3 and the expansion device 4 is integrally fixed to the heating device 2 and to the condenser 5. The fluid machine, the heating device 2 and the condenser 5 are fixed to each other by fixing devices (not shown) As shown in FIG. 11, the liquid-phase refrigerant pumped out from the pump device 1 is supplied to the heating device 2, and heated and vaporized gas-phase refrigerant flows into the expansion device 4. After the refrigerant has been expanded at the expansion device 4, it is discharged to the condenser 5 and finally flows back to the tank 16.

Figure 12:
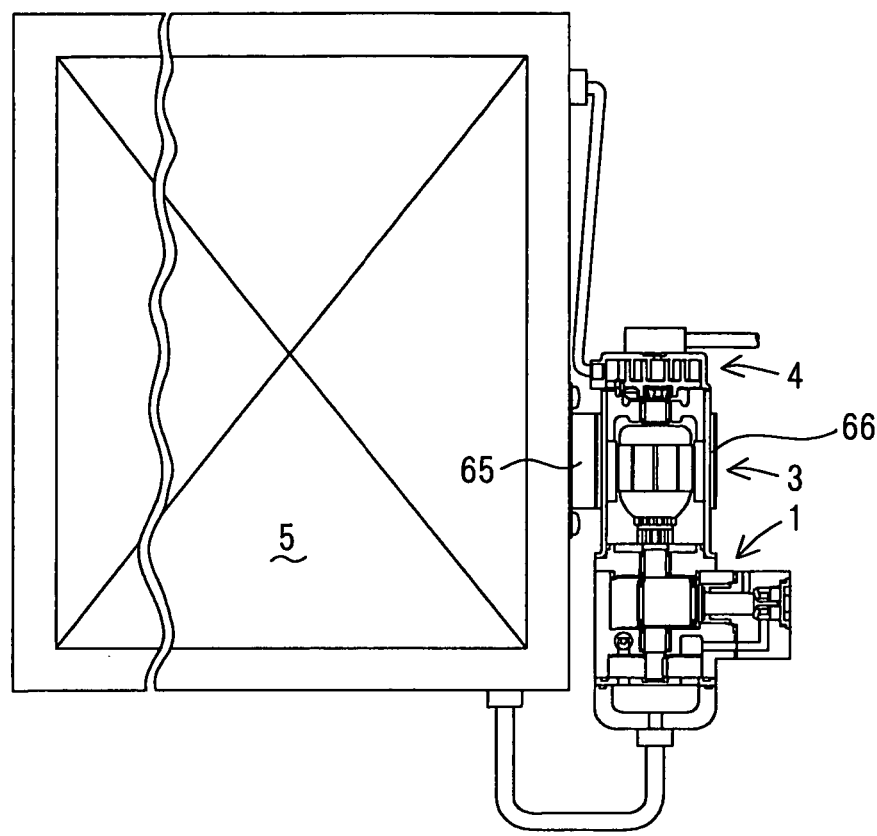
FIG. 12 a schematic diagram showing a modification of the fluid machine shown in FIG. 11.

FIG. 12 shows a modification of the above fifth embodiment, in which the fluid machine is fixed to the condenser 5 by means of a bracket 65. A cushioning element 66, such as urethane, is disposed between the bracket 65 and the housing of the fluid machine to prevent transmission of the vibration from the fluid machine (vibration at the pump device 1, the motor device 3 and/or the expansion device 4) to the condenser 5.

The fluid machine, having the pump device, the motor device and the expansion device, is integrally fixed to the condenser 5, or to the heating device 2 and the condenser 5, in the above embodiments. Accordingly, the structure of the components has become simpler and the system can be made lower in cost, so that the fluid machine as well as the total system integrally fixed with the fluid machine can be installed in the motor vehicle. In particular, in case that the heating device 2 and the condenser 5 are integrally assembled together (FIG. 11), the system for the Rankine cycle is completed by those components, and the pipe arrangement for the system can be minimized.

Sixth Embodiment

Figure 13:
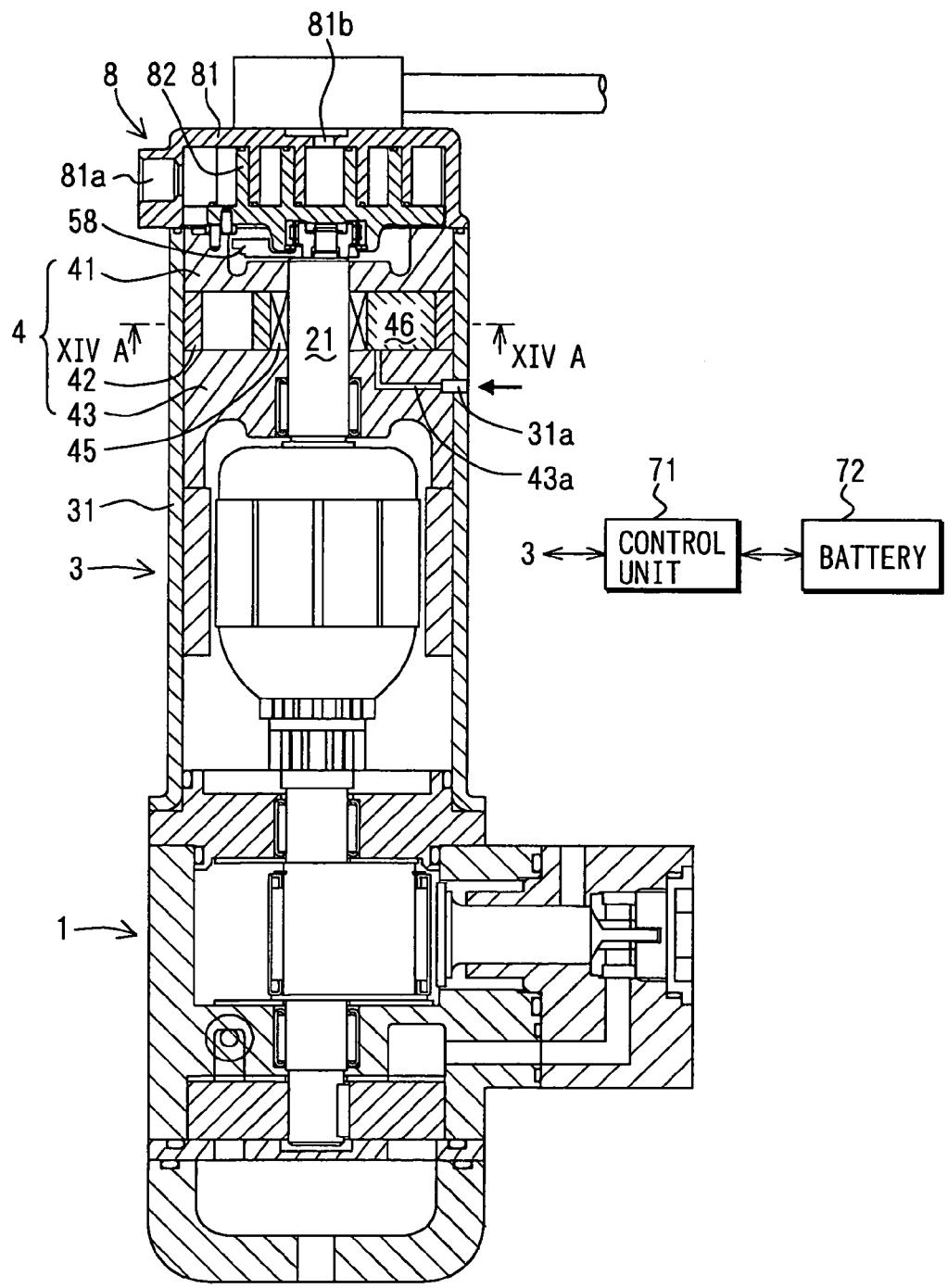
FIG. 13 is a schematic diagram showing the fluid machine according to a sixth embodiment.

A sixth embodiment will be explained with reference to FIGS. 13 to 18. The fluid machine shown in FIG. 13 is different from that of FIG. 1 in that a compressor device 8 for a refrigerating cycle is integrally fixed to a top portion of the fluid machine of the first embodiment. The embodiment of FIG. 13 is further different from FIG. 1 in that a rotary type expansion device 4 is used instead of the scroll type expansion device. The compressor device 8 is so arranged that it is operatively connected to the common shaft 21 for the pump device 1, the motor device 3 and the expansion device 4.

The compressor device 8 of the scroll type in this embodiment has the same structure to that of the scroll type expansion device 4 in FIG. 1. A fixed scroll and a movable scroll 81 and 82 are engaged with each other to form working (compressing) chamber for refrigerant, which is sucked into the working chamber through an inlet port 81*a* provided at an outer periphery of a compressor housing 81 as the movable scroll 82 is rotated, and compressed and pumped out through a discharge port 81*b*. A numeral 58 is a crank mechanism which has the same structure and function to that in the first embodiment of FIG. 1.

Figure 14A:
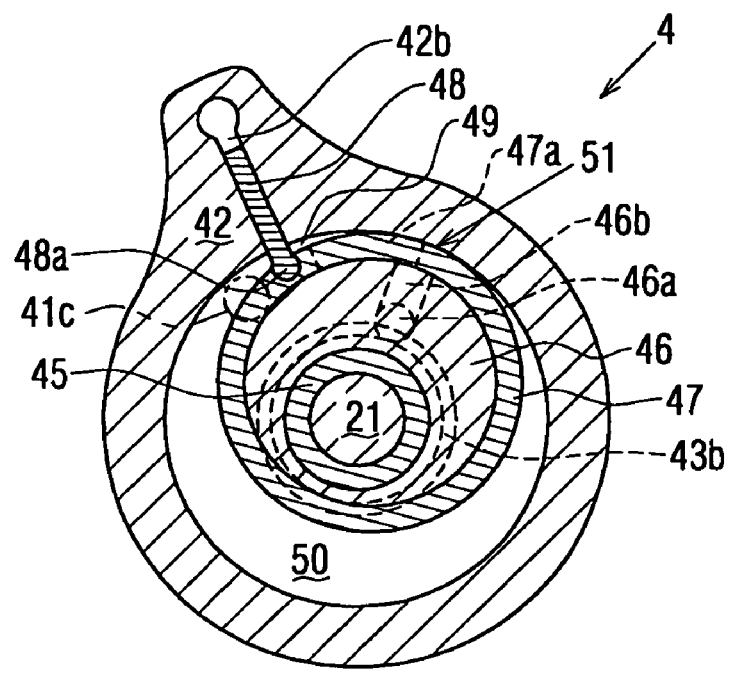
FIG. 14A is a cross-sectional view of an expansion device taken along a line XIVA-XIVA in FIG. 13.

FIG. 14A is a cross-sectional view of the expansion device 4 taken along a line XIVA-XIVA of FIG. 13, in which the expansion device 4 is the rotary type expansion device as mentioned above. A hermetically sealed working chamber 49 is formed in the expansion device 4 to generate a rotational driving force and transmit the force to the shaft 21, by introducing therein high-pressure gas and expanding the same in the working chamber 49. The working chamber 49 is sealed as described below.

The working chamber 49 is formed in the following manner. A lunar space is formed by a cylindrical inner surface of a cylinder 42 and a cylindrical outer surface of a sleeve 47, wherein the cylindrical outer surface is contacted with the cylindrical inner surface at a rotor contact line 51. A forward end of a vane 48 is pivotally connected to a hinge portion 48*a* of the outer cylindrical surface of the sleeve 47, so that the lunar space is divided into two spaces.

The cylinder 42 is interposed between a front and a rear side plates 41 and 43, wherein the sleeve 47 and the vane 48 are disposed in the lunar space with minute gaps between the longitudinal ends thereof and inner surfaces of the plates 41 and 43 so that the sleeve 47 and vane 48 are movable in the lunar space. As above, two working chambers 49 and 50 are formed.

A rotor 46 is connected to the shaft 21 over a one-way clutch 45 and the center of the rotor is eccentric from a center of a circular formed by the cylindrical inner surface of the cylinder 42. An oil film is formed at an outer surface of the rotor 46 and the rotor 46 is inserted into the sleeve 47, wherein a minute gap is formed between the rotor 46 and the sleeve 47 so that they are relatively movable to each other.

A circular groove 43*b* is formed on the inner surface of the rear side plate 43, which is a sliding surface to the rotor 46. A plate inlet passage 43*a* is formed in the rear side plate 43, one end of which is connected to the circular groove 43*b* and the other end of which is connected to an expansion device inlet port 31*a* formed in the yoke 31.

A rotor inlet port 46*a* is formed in the rotor 46, one end of which terminates at one side surface of the rotor 46 and is opening to the circular groove 43*b*, so that one end of the rotor inlet port 46*a* is always communicated with the circular groove 43*b*. The rotor inlet port 46*a* extends in the rotor 46 in a longitudinal direction and the other end thereof is communicated with one end of a rotor radial passage 46*b* which is formed inside the rotor 46 and extending in a radial direction and terminates at the outer peripheral surface of the rotor 46. A sleeve inlet port 47*a* is formed in the sleeve 47 adjacent to the vane 48 and passing through the sleeve in the radial direction.

A passage for the refrigerant is thus formed by the inlet port 31*a* formed in the yoke 31, the plate inlet passage 43*a* formed in the rear side plate 43, the circular groove 43*b* also formed in the surface of the rear side plate 43, the rotor inlet port 46*a* formed in the rotor 46, and the rotor radial passage 46*b* also formed in the rotor 46. And the above refrigerant passage terminates at the inner surface of the sleeve 47 or is communicated to the sleeve inlet port 47*a* depending on a rotational position of the rotor 46.

Since the sleeve inlet port 47*a* is formed in the sleeve 47 with a certain angular length, so long as the outer end of the rotor radial passage 46*b* is communicated to the sleeve inlet port 47*a* the refrigerant will flow into the working chamber 49. A vane groove 42*b* is formed in the cylinder 42, into which the vane 48 is inserted with minute gaps between the vane 48 and the vane groove 42*b*, so that the vane 48 moves back and forth in the groove 42*b*, while keeping a sealing effect.

Since one end of the vane 48 is connected to the sleeve 47 by a hinge joint at the hinge portion 48*a*, the vane 48 moves back and forth depending on a position of orbital movement of the sleeve 47, namely the rotational position of the rotor 46. Cylindrical seal elements (not shown) are disposed on the shaft 21 for sealing a gap between the rear side plate and the shaft 21 as well as a gap between the front side plate and the shaft 21, respectively.

Figure 14B:
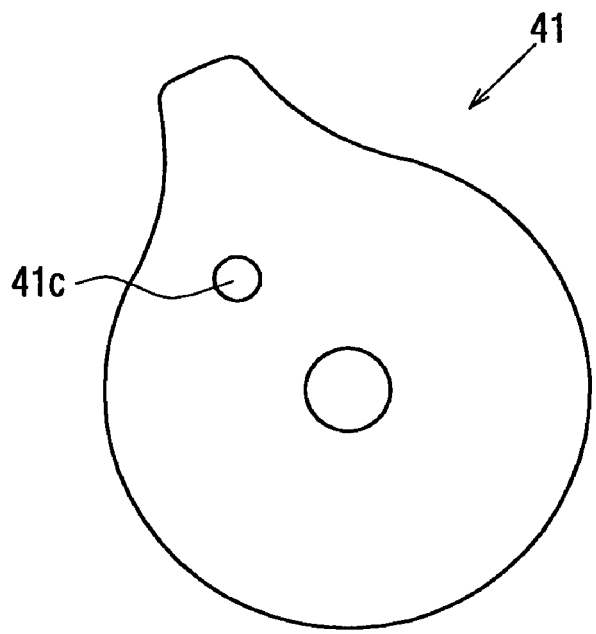
FIG. 14B is a front view of front side plate of the expansion device.

FIG. 14B shows a front view of the front side plate when viewed in a right-hand direction in FIG. 13, wherein a numeral 41*c* designates a discharge port formed in the front side plate 41, one end of which is opening to the space formed by the cylinder 42 and the front and rear side plates 41 and 43 and the other end of which is communicated with the condenser.

Figure 15A:
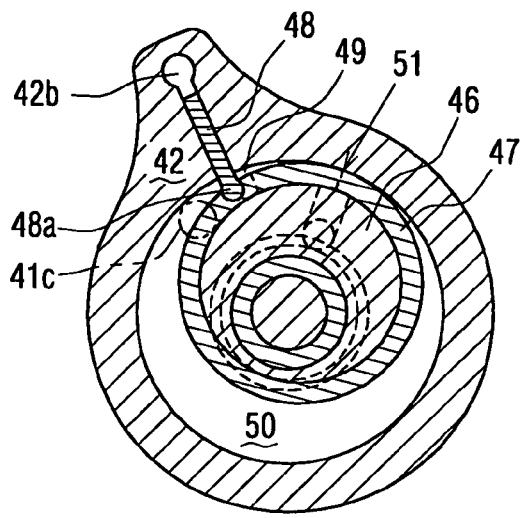
FIGS. 15A to 15D are cross-sectional views of the expansion device for explaining an operation thereof.

An operation of the above explained fluid machine will be explained with reference to FIGS. 15A to 15D. FIG. 15A shows a starting position of the rotor 46, which corresponds to 0 degrees of the rotational angle of the rotor 46. In this position, when high pressure gas is supplied to the expansion device from the Rankine cycle Ra, the high pressure gas flows into the working chamber 49 through the yoke 31, rear side plate 43, the rotor 46 and the sleeve 47. The high pressure gas will be then expanded in the working chamber 49, which is surrounded by the inner surface of the cylinder 42, the outer surface of the sleeve 47, the vane 48, the front side plate 41, rear side plate 43, the hinge portion 48*a* and the rotor contact line 51.

In this position, the other chamber 50 is communicated with the discharge port 41*c*, the refrigerant gas filled in the chamber 50 will flow out through the discharge port 41*c* as the rotor 46 rotates.

Figure 15B:
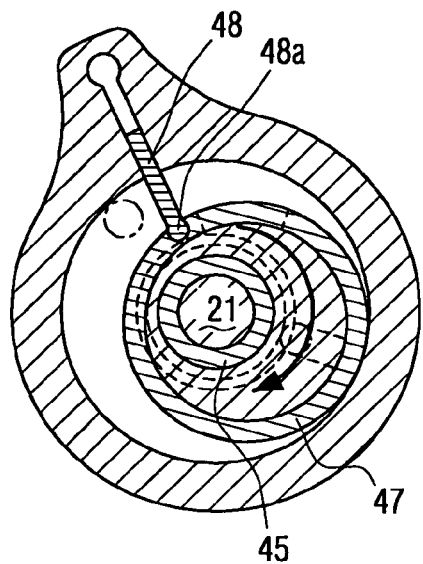

The expansion energy rotates the rotor 46 and the sleeve 47, moving the rotor contact line 51 in a clockwise direction to a position of FIG. 15B, which corresponds to 90 degrees of the rotational angle of the rotor 46. In this operation, the rotor 46 is connected to the shaft 21 over the one-way clutch 45, so that the shaft 21 is likewise rotated by 90 degrees. The vane 48 is pulled out by the hinge portion 48*a* from the groove 42*b* during this operation of 90 degrees rotation, since the vane 48 is connected to the sleeve 47 at the hinge portion 48*a* by the hinge joint.

Figure 15D:
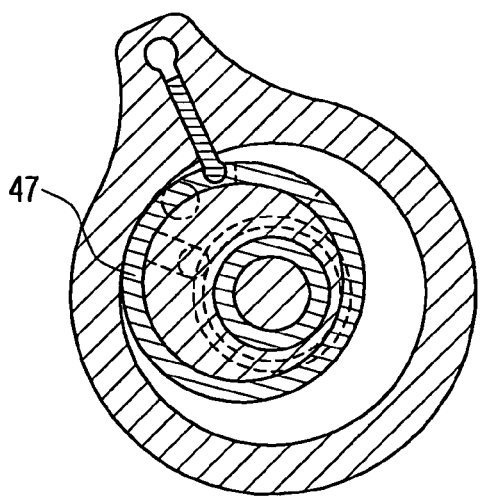
Figure 15C:
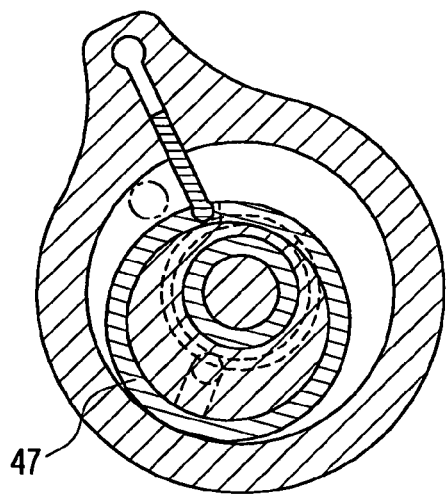

The sleeve 47 is further rotated around the shaft 21 in response to the expansion of the high pressure gas to a position in FIG. 15C and to a position in FIG. 15D, which respectively correspond to the 180 and 270 degrees of the rotational angle of the rotor 46. During this rotation, the shaft 21 is likewise rotated by 270 degrees over the one-way clutch 45.

When the sleeve 47 comes to the position in FIG. 15D, the discharge port 41*c* is closed by the side surfaces of the sleeve 47 and the rotor 46.

When the sleeve 47 is further rotated by the expansion of the high pressure gas, the position of the rotor 46 comes to the starting position of FIG. 15A, and another high pressure gas will flow into the working chamber 49 to repeat the above operation. Thus, so long as the high pressure gas flows into the working chamber, the sleeve 47 continues to rotate and thereby the shaft 21 is also continuously rotated.

It is also possible to use a variable capacitor type expansion device in this embodiment, which will be explained with reference to FIGS. 16 to 18.

Figure 16:
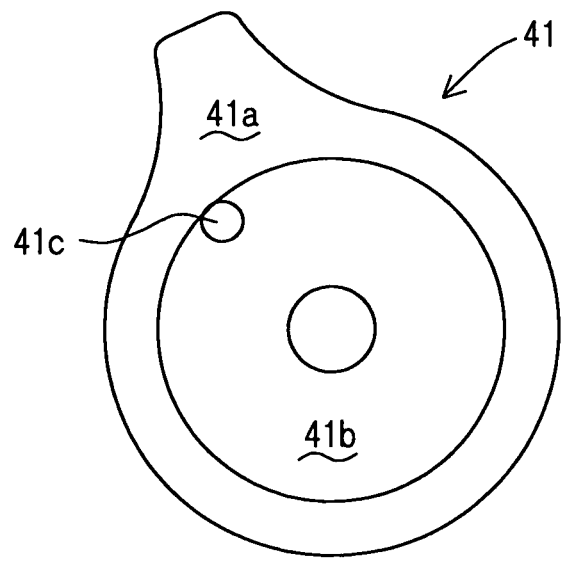
FIG. 16 is a front view of a front side plate when the expansion device in FIG. 14A is changed to a variable capacitor expansion device.

FIG. 16 shows a front view of the front side plate 41, which is divided into two parts (an outer plate 41a and an inner plate 41b) when compared with the embodiment shown in FIGS. 13 to 15. The outer plate 41a has a cylindrical bore into which the inner plate 41b is rotationally inserted so that the relative position of the inner plate 41b to the outer plate 41a will be changeable, and the inner plate 41b will be rotated by a control means (not shown) depending on the operation of the expansion device 4. As seen from FIG. 16, the discharge port 41c is likewise formed in the inner plate 41b, so that the position of the discharge port 41c can be changeable together with the inner plate 41b.

FIGS. 17A to 17D show the respective positions of the rotor 46 and the sleeve 47 at the rotational positions of the rotor 46 of 0, 90, 180 and 270 degrees, as in the same manner of FIGS. 15A to 15D. At the starting position shown in FIG. 17A, the working chamber 49 is communicated to the rotor radial passage 46b through the sleeve inlet port 47a, so that high pressure refrigerant gas flows into the working chamber 49. At the same time, the working chamber 50 begins with the communication to the discharge port 41c, so that the expansion of the refrigerant gas in the chamber 50 stops and the expanded refrigerant flows out through this discharge port 41c.

The rotor 46 and the sleeve 47 are rotated in response to the expansion of the refrigerant gas in the working chamber 49, and the positions of rotor 46 and the sleeve 47 move from FIG. 17A to FIG. 17B, FIG. 17C and FIG. 17D. When the rotor 46 and the sleeve 47 come to the position in FIG. 17D, the discharge port 41c is closed and the discharge stroke of the working chamber 50 comes to an end. Accordingly, the end of the discharge stroke will be decided by the position of the discharge port 41c.

Figure 17A:
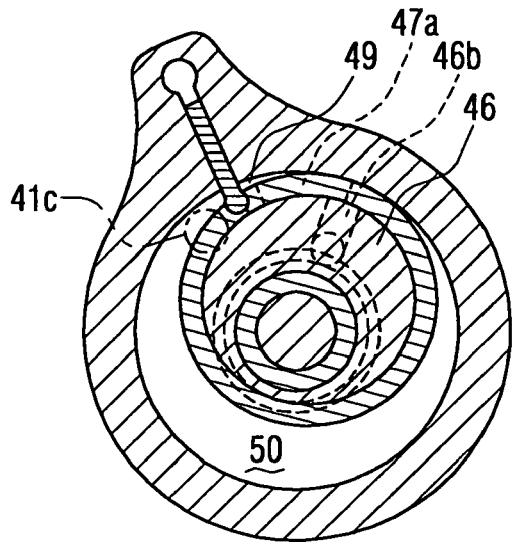
FIGS. 17A to 17D are cross-sectional views of the expansion device of FIG. 16 for explaining an operation thereof.
Figure 17B:
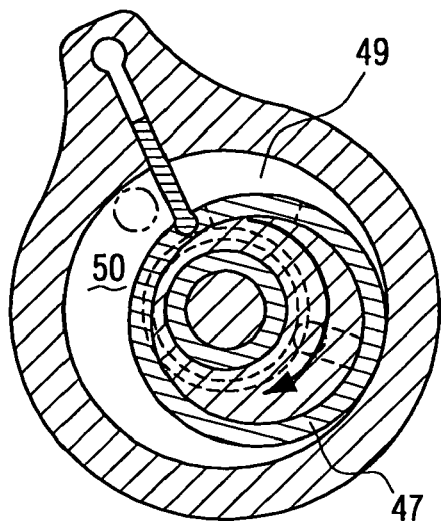
Figure 17D:
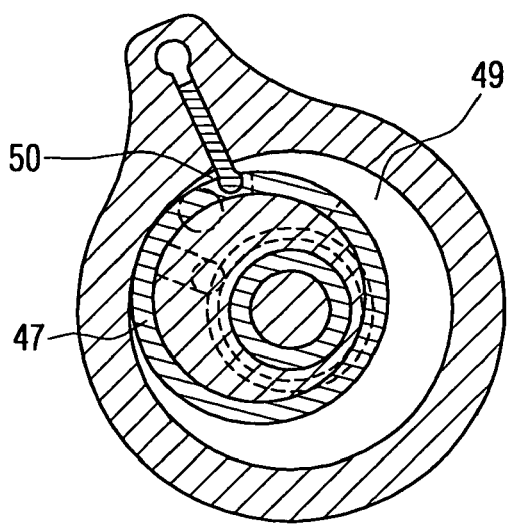
Figure 17C:
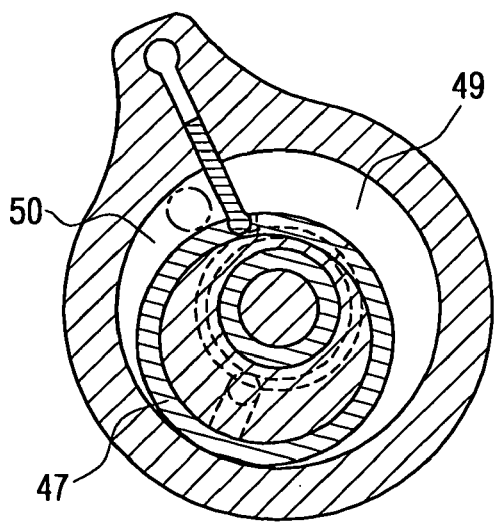

In FIGS. 17A to 17D, the discharge port 41c is positioned at such a point where the discharge port 41c will be closed when the rotor 46 and the sleeve 47 are rotated by 270 degrees from the initial position of FIG. 17A. In other words, the discharge port 41c starts the communication with the working chamber 50 shortly before the rotor 46 is rotated to its initial position of FIG. 17A. In the case that a pressure of the Rankine cycle Ra at its lower pressure side becomes higher, the refrigerant gas in the working chamber should be discharged at an earlier point, namely the discharge stroke shall be ended at the earlier point. Otherwise, the pressure in the working chamber becomes lower than the pressure of the Rankine cycle at its lower pressure side, and thereby instead of collecting the energy from the expansion of the refrigerant gas, additional energy would become necessary for decreasing the pressure in the working chamber to a further lower pressure side, reducing the operating efficiency of the expansion device. (This is referred to as the over expansion phenomenon.)

On the other hand, in the case the pressure of the Rankine cycle Ra at its lower pressure side becomes lower, more energy can be collected by the expansion of the refrigerant gas in the working chamber. And therefore, in such a case the discharge stroke of the refrigerant gas should start at a later point. When the discharge port 41c is positioned at such an earlier point, even if the more energy can be collected from the expansion of the refrigerant gas, the refrigerant gas will flow out through the opening of the discharge port to the working chamber, also reducing the operating efficiency of the expansion device. (This is referred to as the insufficient expansion phenomenon.)

Figure 18A:
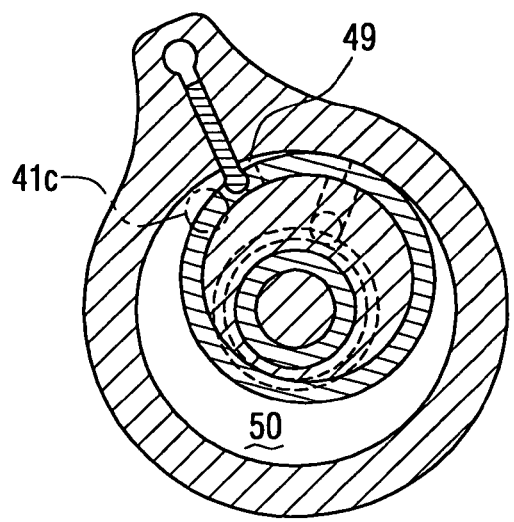
FIGS. 18A to 18D are cross-sectional views of the expansion device of FIG. 16 for explaining the operation of capacitor variation.
Figure 18D:
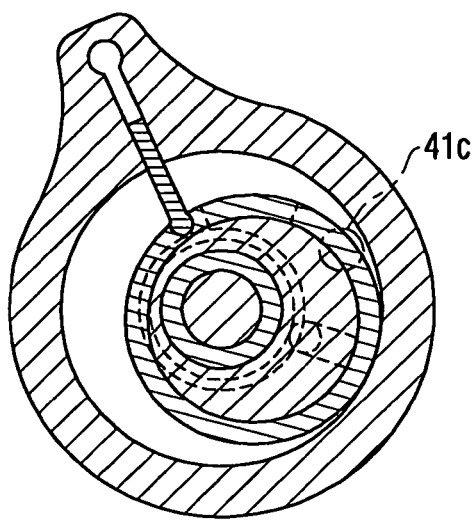
Figure 18B:
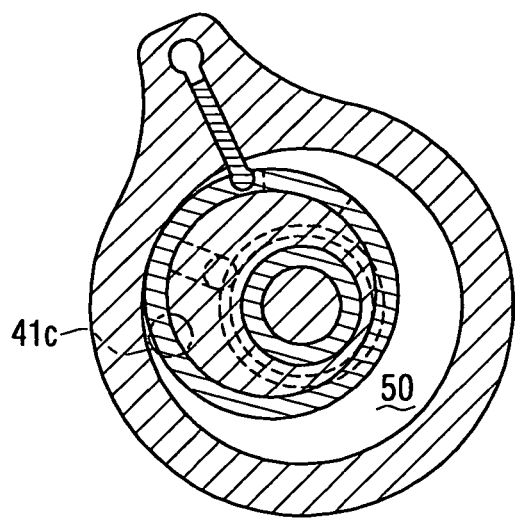
Figure 18C:
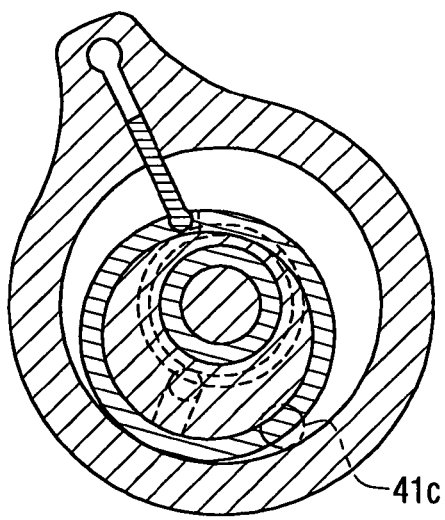

FIGS. 18A to 18D show the various positions of the discharge port 41c for changing the expansion volume of the refrigerant gas in the working chamber. FIG. 18A shows the position of the discharge port 41c, which is the same to that shown in FIG. 17A. FIG. 18B shows the position of the discharge port 41c which is rotated by 90 degrees in a anti-clockwise direction. This rotation will be done by an actuator (not shown), by rotating the inner plate 41b. With the discharge port 41c at the position in FIG. 18B, the discharge stroke of the working chamber 50 will be earlier ended than the position of the discharge port 41c of FIG. 18A by 90 degrees. FIGS. 18C and 18D likewise show other positions of the discharge port 41c, wherein the discharge port 41c is further rotated in the anti-clockwise direction by 180 and 270 degrees, respectively. As above, the expansion space (volume) of the working chamber before starting the discharge stroke can be made smaller by moving the discharge port 41c in the anti-clockwise direction. Accordingly, when the pressure of the Rankine cycle at its lower pressure side is increased, the discharge port 41c can be moved in the anti-clockwise direction in response to such pressure increase, to suppress the excessive expansion of the refrigerant gas, and vice versa. As a result, the expansion device 4 can be operated at its highest operational efficiency by changing the expansion volume of the working chamber in accordance with the operational condition of the Rankine cycle.

Figure 6:
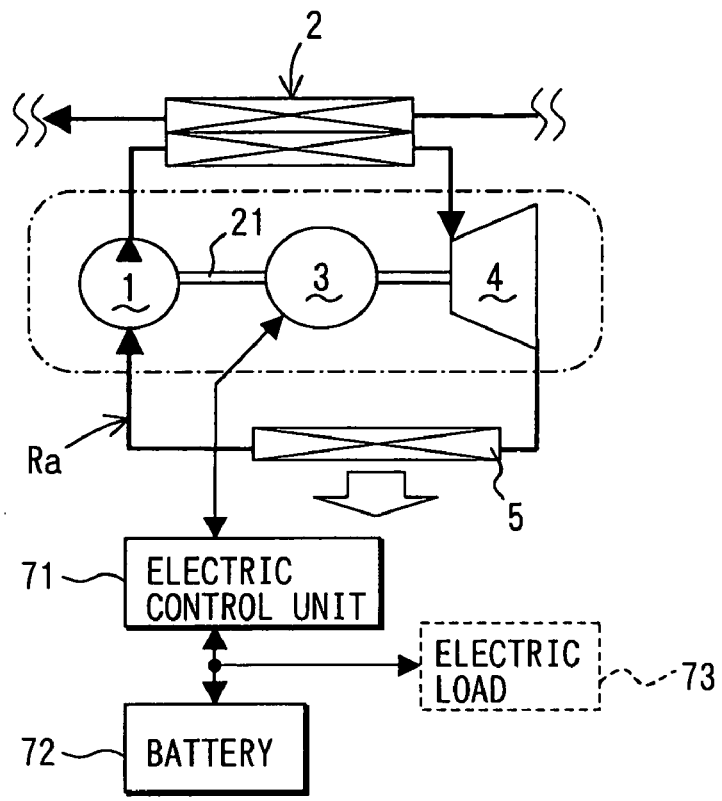
FIG. 6 is a schematic diagram showing a Rankine cycle Ra and an electric circuit according to a second embodiment.

In the embodiment described above with reference to FIGS. 13 to 18, the control unit 71 and the battery 72 are connected to the fluid machine, as in the same manner of the second embodiment shown in FIG. 6. The control unit 71 controls the operation of the motor device 3, so that the motor operation is switched to the power generating operation to charge the electricity generated at the motor device 3 into the battery 72.

The compressor device 8 is driven by the motor device 3 or the expansion device 4, in which the shaft 21 is commonly used. When the shaft 21 is rotated, the movable scroll 82 is rotated with orbital motion through the crank mechanism 58. The working chamber formed by the fixed and movable scrolls changes its working volume to compress the refrigerant, and compressed refrigerant will be pumped out through the discharge port 81b, to a refrigerating cycle (not shown) to perform a climate control, refrigeration and so on.

When the compressor device 8 as well as the motor device 3 is driven by the expansion device 4, the rotational speed of the compressor device 8 will be decreased and thereby the compressor performance will be likewise decreased, because the driving force generated at the expansion device 4 is dispersed for driving the compressor device 8 and the motor device 3. When the rotational speed is decreased, a balance between the high pressure and the lower pressure in the Rankine cycle Ra is changed, which may likely reduce the efficiency of the expansion device 4. It is, however, possible to keep the maximum operational efficiency in this embodiment, because the expansion device 4 has a function of changing the operational capacitor depending on the various operational conditions of the system.

It is also possible to use a variable capacitor type compressor in place of the compressor device 8, the structure of which can be so made as in the first embodiment, in which the scroll type expansion device of the variable capacitor is used. When the capacitor of the compressor device is changed depending on demands of the refrigerating cycle, the compressor performance can be controlled and at the same time the pressure balance of the Rankine cycle may not be changed to a larger extent, so that the operation of the compressor device 8 as well as the motor device 3 can be smoothly obtained.

As described above, the expansion device 8 is operatively connected to the shaft 21 over the one way clutch 45. Accordingly, even when the expansion device 4 is not operating, it would not be an obstacle to the operation of the motor device 3, the pump device 1 and the compressor device 8. The compressor device 8 is operatively connected to the shaft 21, so that the heat energy collected and the rotational force generated at the expansion device 4 can be used for the refrigerating cycle.

In the case that the fluid machine according to the invention is used for the motor vehicle, the operation of conventional compressor and alternator each driven by an engine can be stopped when the compressor device and the motor device are respectively driven by the expansion device, so that a load to the engine can be reduced to thereby improve a fuel consumption ratio. Since the compressor device 8 is integrally connected to the fluid machine having the expansion device, the motor device and the pump device, the structure becomes simpler and smaller and the cost thereof can be reduced, and as a result the fluid machine can be installed in the motor vehicle.

The control unit 71 for controlling the motor device 3 and the battery 72 for charging the electricity are electrically connected to the fluid machine, so that the Rankine cycle Ra can be smoothly started up and the operational mode of the motor device 3 can be easily switched from the motor mode to the power generating mode after the Rankine cycle Ra has started up with its operation. It is further possible to generate the electricity by keeping the maximum efficiency of the expansion device 4 depending on the heat energy inputted to the Rankine cycle. The driving force generated at the expansion device 4 can be divided to the compressor device 8 and to the motor device 3 in the most optimum manner by controlling the electricity to be generated at the motor device 3, so that the heat energy collected and the rotational force generated at the expansion device can be most effectively utilized.

Other Embodiments

It is not limited to the engine to be used as a source for supplying the heat energy to the Rankine cycle Ra. The expansion device 4 is not limited to the scroll type or the rotary type. The fluid machine can be used not only for the motor vehicle but for an engine driving system of a stationary engine, such as an air conditioning system or refrigerating system having a stationary engine for driving such system.

What is claimed is:

1. A fluid machine for converting heat energy into mechanical driving force comprising:
    a housing;
    an expansion device housed in the housing and forming a part of Rankine cycle for collecting heat energy from refrigerant and converting the collected heat energy into the mechanical driving force, the Rankine cycle being further formed from a heating device for heating the refrigerant for the Rankine cycle by heat energy of the working fluid flowing through the heating device and a condenser for condensing the refrigerant from the expansion device;
    an electric rotating device rotationally supported in the housing and selectively operating as an electric motor for generating rotational force and as an electric power generator for generating electric power;
    a pump device housed in the housing and operatively connected to the expansion device and the electric rotating device, so that the pump device is operated by one of the mechanical driving force from the expansion device and the rotational force from the electric rotating device, wherein the pump device forms a part of the Rankine cycle for pressurizing and feeding liquid-phase refrigerant from the condenser to the heating device; and
    a shaft rotationally supported in the housing and operatively connecting the expansion device, the electric rotating device and the pump device,
    wherein the electric rotating device is operated as the electric motor for rotating the pump device to start up the operation of the Rankine cycle, and operated as the electric power generator by the mechanical driving force from the expansion device after the expansion device has started with its operation,
    wherein the housing further defines a tank for receiving the liquid-phase refrigerant, such that the liquid-phase refrigerant is fed to the pump device,
    wherein the expansion device, the electric rotating device and the pump device are arranged in a vertical direction, the pump device is arranged in its vertical direction at a lower position than the other two components, and an inlet port of the refrigerant from the condenser is formed in the housing at a position higher than the electric rotating device in the vertical direction,
    wherein the tank is formed at the vertically lowermost position of the housing for receiving and keeping the liquid-phase refrigerant.

2. A fluid machine according to claim 1, wherein the expansion device, the electric rotating device and the pump device are housed in a single hermetically sealed housing.

3. A fluid machine according to claim 1, wherein the expansion device, the electric rotating device and the pump device are disposed in the refrigerant for the Rankine cycle.

4. A fluid machine according to claim 1, wherein
    the expansion device comprises a fixed scroll and a movable scroll rotating with orbital motion with respect to the fixed scroll, and
    the movable scroll is operatively connected to the shaft over a crank mechanism so that a radius of the orbital motion is changed depending on the mechanical driving force generated at the expansion device.

5. A fluid machine according to claim 1, wherein
    the expansion device is operatively connected to the shaft over a one way clutch, so that the mechanical driving force is transmitted from the expansion device to the electric rotating device, while the rotational force is not transmitted in the reversed direction from the electric rotating device to the expansion device.

6. A fluid machine according to claim 1, wherein
    the electric rotating device comprises a direct current rotating machine.

7. A fluid machine according to claim 6, wherein
    the electric rotating device is so arranged that a rotational direction when it is operated as the electric motor is made to be the same to that when it is operated as the electric power generator.

8. A fluid machine according to claim 1, wherein the motor device is electrically connected to a control unit and a charging device, so that the operational mode of the motor device is controlled by the control unit and the electricity generated at the motor device will be charged into the charging device.

9. A fluid machine according to claim 1, wherein a flow control device is provided at an upstream side of the heating device so that the flow of the working fluid will be controlled.

10. A fluid machine according to claim 1, wherein the expansion device is of the variable capacitor type expansion device.

11. A fluid machine according to claim 1, wherein the fluid machine is integrally assembled to at least one of the condenser and the heating device.

12. A fluid machine according to claim 1, further comprising a compressor device for compressing refrigerant for a refrigerating cycle, which is integrally fixed to the housing of the fluid machine so that the compressor device is operatively connected to the shaft.

* * * * *